United States Patent [19]

Gallery et al.

[11] Patent Number: 5,367,452
[45] Date of Patent: Nov. 22, 1994

[54] MOBILE MERCHANDISING BUSINESS MANAGEMENT SYSTEM WHICH PROVIDES COMPREHENSIVE SUPPORT SERVICES FOR TRANSPORTABLE BUSINESS OPERATIONS

[75] Inventors: Stanley A. Gallery, Golden; Timothy R. Schultz, Colorado Springs, both of Colo.

[73] Assignee: Carts of Colorado, Inc., Commerce City, Colo.

[21] Appl. No.: 593,236

[22] Filed: Oct. 5, 1990

[51] Int. Cl.$^5$ .................. G06F 15/22; G06F 15/00
[52] U.S. Cl. ...................... 364/401; 364/403
[58] Field of Search ............ 364/401, 403, 405, 406, 364/550, 505, 479; 340/825.54, 825.69; 235/375, 381

[56] References Cited

U.S. PATENT DOCUMENTS

| | | | |
|---|---|---|---|
| 3,899,775 | 8/1975 | Larsen | 364/405 |
| 4,522,333 | 6/1985 | Blau, Jr. et al. | 364/505 |
| 4,527,247 | 7/1985 | Kaiser et al. | 364/900 |
| 4,563,739 | 1/1986 | Gerpheide et al. | 364/403 |
| 4,598,272 | 7/1986 | Cox | 340/539 |
| 4,602,343 | 7/1986 | Dougherty | 364/138 |
| 4,621,325 | 11/1986 | Naftzger et al. | 364/406 |
| 4,622,538 | 11/1986 | Whynacht et al. | 340/506 |
| 4,636,950 | 1/1987 | Caswell et al. | 364/403 |
| 4,656,463 | 4/1987 | Anders et al. | 340/572 |
| 4,658,357 | 4/1987 | Carroll et al. | 364/406 |
| 4,668,939 | 5/1987 | Kimura et al. | 340/825.54 |
| 4,672,365 | 6/1987 | Gehman et al. | 340/539 |
| 4,695,954 | 9/1987 | Rose et al. | 364/413.01 |
| 4,722,054 | 1/1988 | Yorozu et al. | 364/405 |
| 4,737,910 | 4/1988 | Kimbrow | 364/403 |
| 4,777,488 | 10/1988 | Carlman, Jr. et al. | 340/825.72 |
| 4,783,740 | 11/1988 | Ishizawa et al. | 364/403 |
| 4,887,208 | 12/1989 | Schneider et al. | 364/403 |
| 5,031,098 | 7/1991 | Miller et al | 364/405 |
| 5,052,504 | 10/1991 | Ikeda et al. | 364/405 |
| 5,091,713 | 2/1992 | Horne et al. | 364/479 |

FOREIGN PATENT DOCUMENTS 0166573 12/1981 Japan .
0196364 8/1986 Japan .

*Primary Examiner*—Roy N. Envall, Jr.
*Assistant Examiner*—Xuong Chung
*Attorney, Agent, or Firm*—Klaas, Law, O'Meara & Malkin

[57] ABSTRACT

A computer based system is used for providing a comprehensive set of business support services for mobile business operations such as merchandising carts and kiosks. The services include: i.) providing a two-way computerized communication link between the mobile business unit and a headquarters base station via radio telemetry or ground lines, ii.) a data capture facility which polls a variety of intelligent devices, such as temperature sensors and inventory level indicators, packages the data for subsequent transmission to the base station and summaries the data for display on the mobile system control panel, iii.) a base station communication facility which transmits messages and computer commands to remote carts and kiosks and initiates outbound paging, iv.) a base station mass storage and reporting facility which stores historical data related to product sales, cashier settlement, inventory control and in bound messages for subsequent retrieval and reporting.

11 Claims, 4 Drawing Sheets

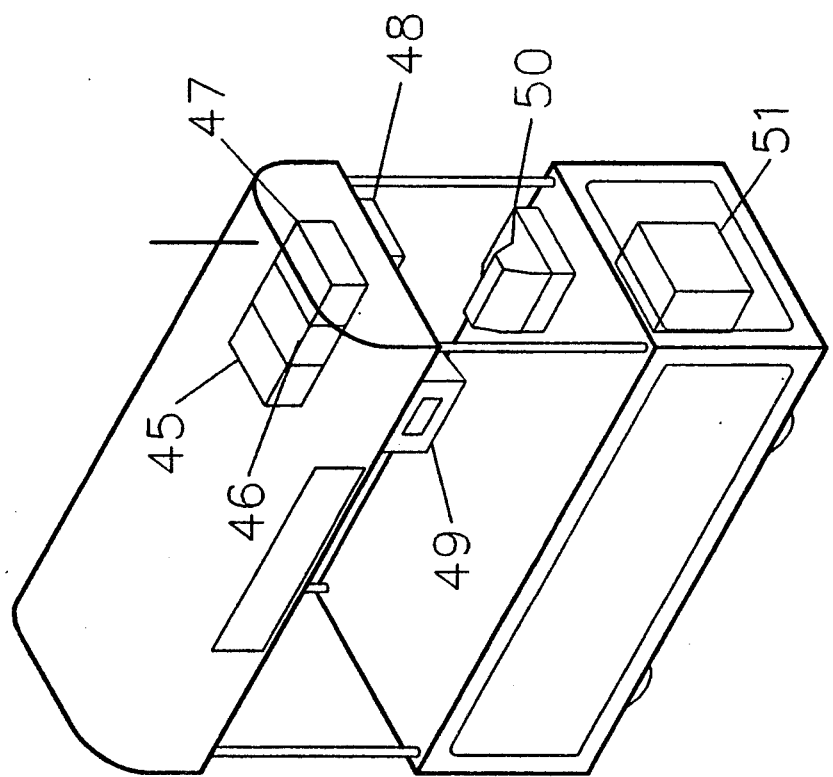
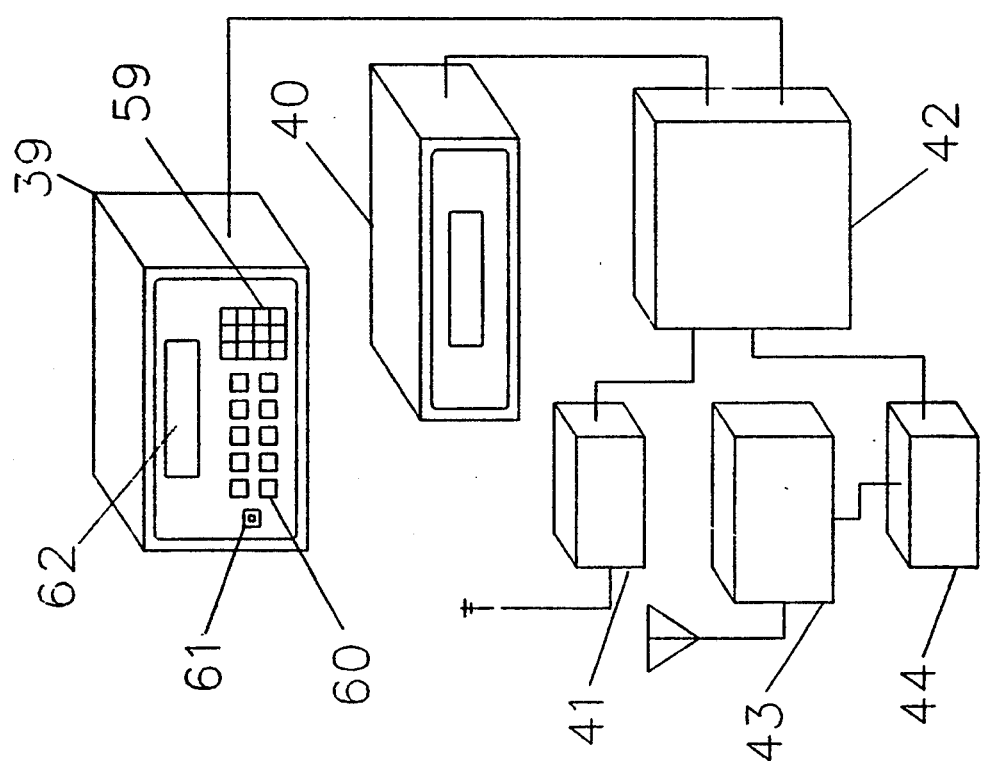
FIGURE 2
FIGURE 1

MOBILE MERCHANDISING BUSINESS MANAGEMENT SYSTEM WHICH PROVIDES COMPREHENSIVE SUPPORT SERVICES FOR TRANSPORTABLE BUSINESS OPERATIONS

FIELD OF THE INVENTION

This invention pertains to a system for use in providing an umbrella of management support services for a fleet operator of mobile merchandising carts and kiosks. The system provides a means to acquire via a real time communication system business management information from remote based mobile merchandising business units and gain control of key business resources including personnel utilization, cash management, inventory control, equipment maintenance, product quality and to enhanced personnel and property security through a real time security alert mechanism. The system of the present invention is particularly useful for the management of multiple remote business units typically operated by people with limited skills and without resident management supervision. Concessioners, vendors of name brand food products, institutional feeders, amusement park operators, food manufactures, shopping mall operators and restauranteurs are the primary intended applications, although the system has utility in a variety of situations where products are sold and dispensed. Another possible application may be in conjunction with the installation of several vending machines at a given location.

BACKGROUND OF THE INVENTION

Effective management control of remote mobile merchandising business units such as carts and kiosks has traditionally been a major problem and concern for operators. The lack of generally available business resources such as telephone communication lines and electronic POS (Point of Sale computerized cash register system) system hookups, sufficient inventory storage space, hourly employee supervision and adequate maintenance support make the effective and profitable management of mobile business units much more difficult then the traditional brick and mortar fixed location alternatives. As a result, the potential for a successful mobile merchandising operation has been diminished in the past because of the lack of appropriate management information and communication capabilities.

Partial attempts at supplying solutions to some of the problems involved in effective management of mobile business operations have been made in the past. These attempts have only been directed toward partial solutions to the more complex problems of effective overall mobile cart and kiosk professional management. For example, people have used conventional cash registers in conjunction with mobile carts and kiosks but have not been able to successfully use computerized POS systems because POS systems are dependent upon access to communication lines and communication lines are not generally available at random locations. The lack of POS availability significantly limits management's ability to make effective and timely business decisions.

Other radio technologies have been previously used in conjunction with carts and kiosks such as voice radio transmissions however, such arrangements have been primarily contemplated for use in an informal communications environment and not in conjunction with the formal transmission of business management information in a computer readable media designed to provide management with up to the minute information necessary to the profitable operation of cart and kiosk fleets.

Motion detector devices are known but not generally contemplated to be used in conjunction with mobile business enterprises and particularly as an integrate function within a comprehensive mobile business management system. Use of a motion detection device without full integration with the other elements of the present invention such as automatic paging, which informs a manager, wherever he or she happens to be located, of a security breach, would restrict its value and usefulness to its owner.

Inventory tracking systems for warehouses and the like are also known, however they are not readily adaptable to the specific and unique requirements associated with the successful operation of mobile carts and kiosks. Since carts and kiosks have limited storage capacity an operator must be able to communicate a inventory replenishment request in a real time fashion and have that request serviced immediately. Replenishment schemes generally available with convention systems would prove to be totally inadequate.

SUMMARY OF THE INVENTION

In accordance with its broad aspects, the present invention provides a system for managing a fleet of mobile merchandising carts and kiosks including the management of personnel, cash resources, equipment status via operator requests for service and fully automatic functions, inventory control and enhanced personnel and equipment security via operator actuated request for assistance and fully automatic motion detection with automatic security alert.

The present invention is particularly useful in mobile business operations where an operator has the need to effectively management several remote locations simultaneously, where it is not possible to have a supervisor managing hourly employees at each location and where high volume sales, regular inventory replenishment, requirements and proper operation of on board business equipment such as beverage systems, refrigeration units, hot wells and the like is important to the overall profitable operation of the location.

Several automated reports are prepared as an automatic by product of normal business activities. the reports include: Hourly sales recaps by dollars, product, operator and location, Inventory valuation by location, Inventory turns by product, Inventory stock outs by location, Historical Sales Analysis selected for interval date ranges including event, daily, weekly and monthly and annually by product, by location, by operator and by product., Cashier settlement reporting by cashier, by shift, by location, Work Dispatch reports for maintenance requests, change requests, staffing requests, inventory replenishment request and requests for emergency assistance, The information provided is comprehensive in nature and will contribute significantly to the overall growth and economic viability of the business establishment.

The system of the present invention is composed of two major system components the mobile system configuration, one for each mobile merchandising location, and the headquarters home base configuration. In turn each mobile system configuration is composed of the communication link manager, the data capture facility manager and several other hardware and software components. The headquarters home base configuration is composed of the base station communication facility manager and the base station mass storage and reporting facility manager and several other hardware and software components.

The communication link manager provides primary communication link to the base station through radio telemetry with a secondary link provided through modem connection to ground communication lines.

The data capture facility manager is a system of computer programs, located in program memory, designed to send signals to intelligent devices and solicit responses in the form of business data or encoded messages (i.e. status updates.) The data is processed into an appropriate form stored in (non-volatile) data storage memory and communicated back to the headquarters base station for additional processing. Signals are periodically sent to POS terminal(s) (computerized cash registers), motion detector(s), a series of thermometers designed to measure ambient temperatures, refrigeration temperatures and heating element temperatures, continuity testers, and a series of sensors designed to measure the quantity of available fresh water, waste water, ice, gaseous fuel, and $CO_2$.

The base station communication facility manager is a series of programs executing on a PC (personal computer) workstation designed to establish and maintain communications with up to 150 remote locations via radio telemetry or ground lines. Each location is periodically polled soliciting business data or encoded messages. Business data is stored on hard disk for subsequent reporting. Encoded messages will result in an immediate response. This response will be in the form of a message sent to the paging system for subsequent transmission to the appropriate individual wearing a pager or to a printer in the form of a work order dispatch. Outbound messages may also be transmitted to remote locations instructing operators to perform specified tasks or in the form of computer commands instructing the micro computer to perform a specified function such as changing a price in the on board POS device.

The base station mass storage and reporting facility manager is a series of programs executing on a PC workstation which is designed to store data received from remote locations and to provide sales analysis reporting, cashier settlement reporting, inventory control reporting and a recap of all in bound messages including: requests for staffing, requests for service, requests for change, requests for inventory, requests for emergency assistance.

The nature and details of the present invention can be more completely understood by reference to the following description of a preferred embodiment, taken in conjunction with the drawings, and from the appended claims.

DRAWINGS

FIG. 1 is a perspective view of apparatus embodying the mobile system components of the present invention;

FIG. 2 is a perspective view of apparatus embodying the mobile system components as they would be typically configured on a mobile merchandising cart;

DETAIL DESCRIPTION OF THE PREFERRED EMBODIMENT

Figures 3, 6:
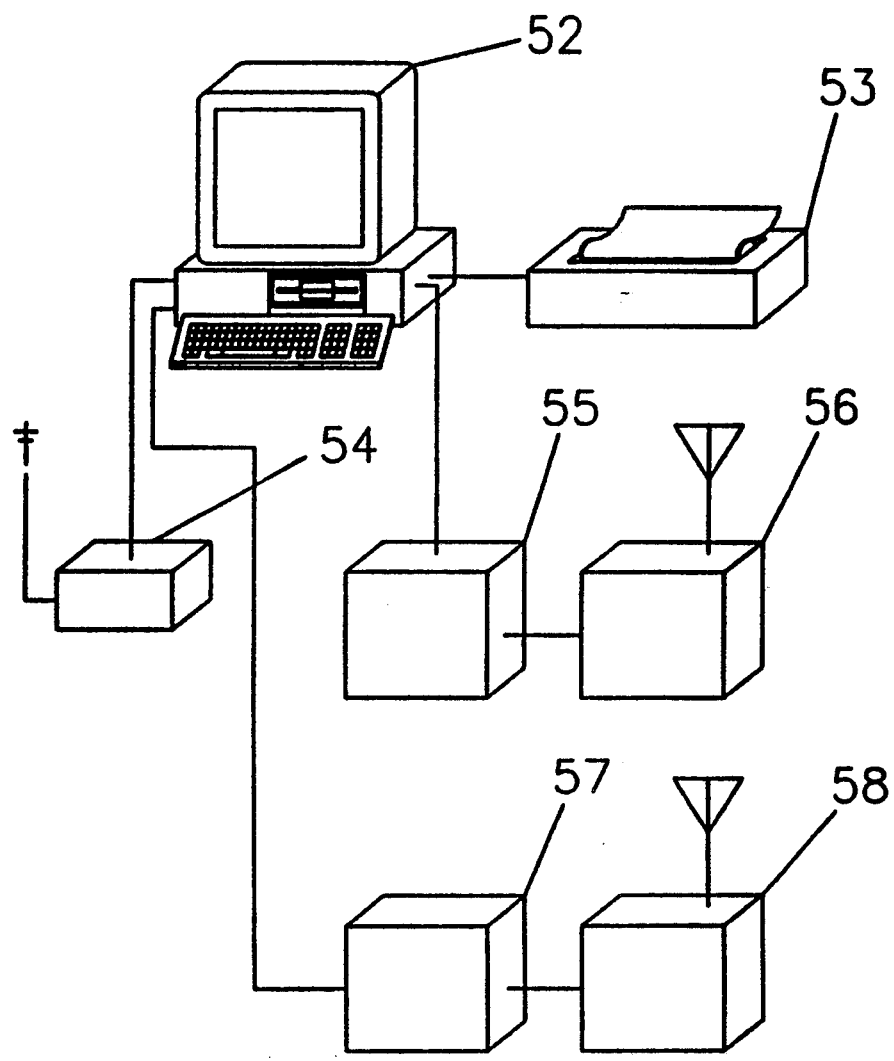
FIG. 3 is a perspective view of apparatus embodying the headquarters base station system components of the present invention.
FIG. 6 is a block diagram of an emergency menu.

The system of the present invention is embodied in the apparatus 39, 40 and 42 shown in FIG. 1. In addition a well known radio telemetry configuration composed of a T-switch with Terminal node controller 44, a UHF transmitter and transceiver 43 and a 4800 baud self correcting modem 41 are necessary components required to facilitate real time communications between the remote satellite mobile merchandising locations and the home base. As is known the radio telemetry components enable the present invention to transmit conventional computer data in ASCII code to a receiving station at the home base. The modem communication link is provided as a less costly alternative when conventional telecommunication, telephone lines, are available for direct hookup.

The apparatus 42 contains the microprocessor and resident micro code enabling the major systems functionality. A detail explanation of apparatus 42 follows in the description of FIG. 4 below. Apparatus 40 is a customer display module which receives signals from the microprocessor for the purpose of displaying product pricing and transaction information to a customer.

The apparatus 39 includes at least one keyboard 59 which is used to control the operation of the system and to manually enter information, as is described below. A series of buttons 60 are used for special input considerations as detailed below. The data port 61 is a well known J11 phone jack type connection used to transfer data stored in the processor memory to and industry standard portable PC or well known hand held PC compatible data collection terminal with a custom four wire cable connecting a standard PC RS232 serial port to the present invention data port 61 via a J11 cable end. A conventional display 62 is also included which is used to display operator lead through messages, system error message and various application oriented business displays such as: (i) a recap of daily sales by product, in dollars and units, (ii) the inventory status of all products being tracked by the system, (iii) the electrical status (on or off) of all electrical equipment and appliances, such as refrigeration units, heating wells, soda fountain pumps and the like which are plugged into the electrical switch controller 23 of the micro computer processor 1, (iv) the maintenance status of the mobile cart or kiosk, including the serial number of the unit, the date of the last service call, the in service date (the first date the cart or kiosk was operational - provided to calculate whether or not the cart or kiosk is eligible for warranty repair), (v) temperature read outs on all equipment which are temperature sensitive along with a pass or fail icon indicating whether or not the piece of equipment is operating in the desired temperature range, (vi) a login function which is used to enter a password.

A legal password must be entered before the system will become operational.

The system apparatus 42 is shown in FIG. 2 referenced as 51 showing the typical location of the microprocessor cabinetry when configured on a mobile merchandising cart. Furthermore, the POS system 50 would be located on the primary working surface cable connected through a hole in the deck top of the cart interfacing to the microprocessor system 51 through a well known RS232 interface. The control panel 39 referenced as 48 in FIG. 2 would be located at a overhead position providing optimal viewing and easy access for interacting with cart operators. The radio telemetry node controller component is referenced as 47 in FIG. 2, the radio component 43 is referenced as component 45 and 46 in FIG. 2 detailing the fact that the radio is made up of two fundamental components a radio receiver 46 and a radio transmitter 45 facilitating two way communications of data between the mobile cart or kiosk location and the headquarters base station. The customer display 40 is referenced as 49 in FIG. 2.

Figure 4:
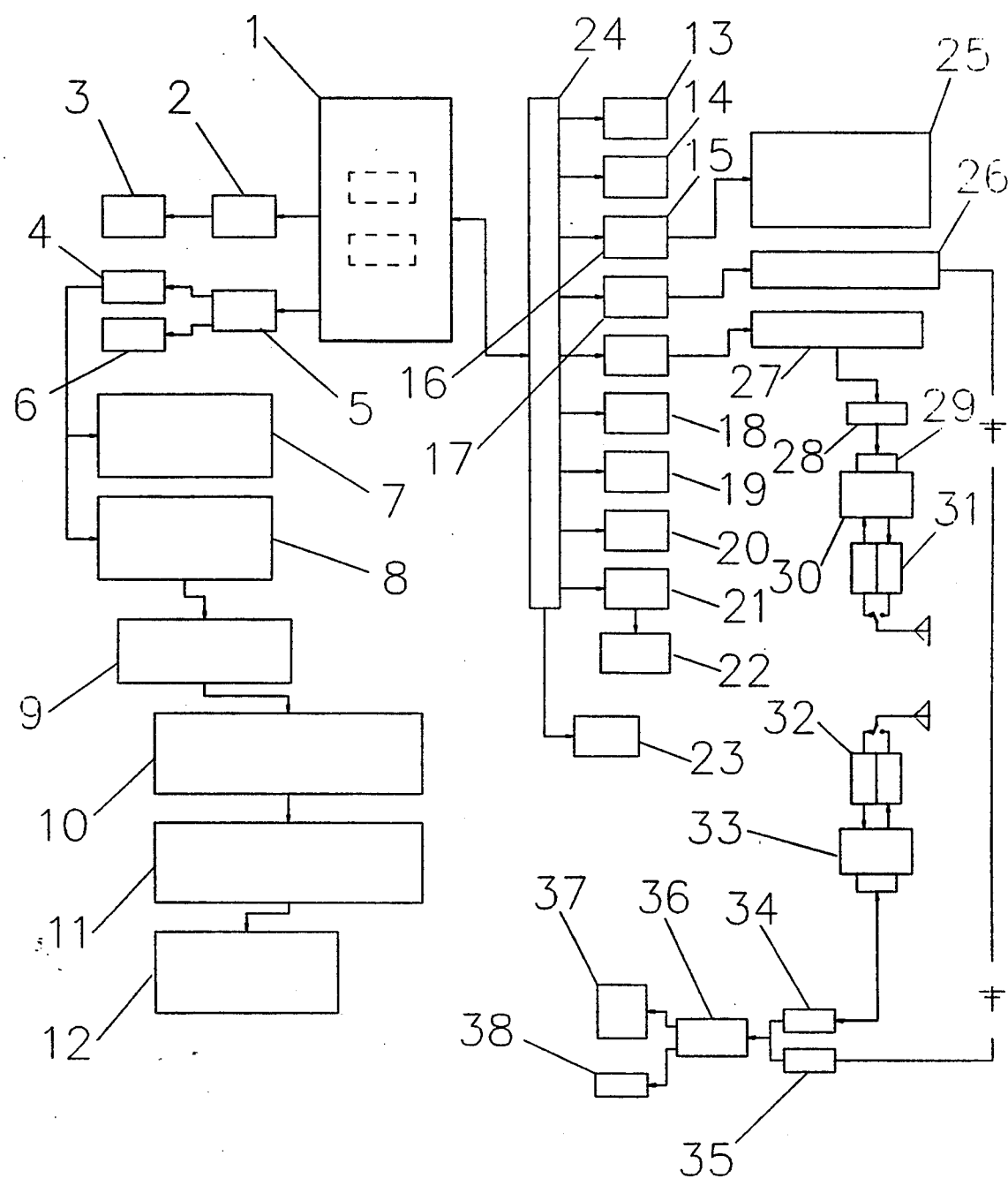
FIG. 4 is a block diagram of the system of the present invention which is incorporated within the apparatus shown in FIG. 1 and FIG. 3.

The system apparatus 42 is shown in FIG. 4. wherein it is referenced 1. The heart of the system 1 is a microprocessor-based microcomputer which serves as means for controlling the operation of the system and its primary functions as hereafter described.

The customer display 40 referenced as 3 in FIG. 4 is operationally connected to the microprocessor through the customer display interface 2 which is composed of a RS232 style interface with appropriate cable of custom length. The control panel 39 is connected to the microprocessor through a microprocessor controlled keyboard - display interface 5 via a RS232 connection with appropriate cable. The microprocessor controller accepts input from the numerical well known 10-key style keyboard 4 referenced in FIG. 1 as 59 and a series of ON/OFF keys 7 and special communication function keys 8 (which were previously referenced in FIG. 1 as 60). The controller interface 5 provides buffered input for up to 128 characters.

The numeric 10-key keyboard 4 is used for entering numeric data such as a pass word for system access, menu selection numbers which are displayed on the customer display 62 (referenced as 6 in FIG. 4) which enables the operator to view various informational displays as discussed above, part numbers of the inventory product which the cart operator needs to be replenished along with the appropriate quantity information, the number of employees requested in a request for staffing, a security code identifying the type of security situation when requesting emergency assistance, the type and quantity of currency and change needed in a request for change transaction and the appropriate maintenance code when requesting maintenance assistance. The information is subsequently signaled to the microprocessor, placed in a que and transmitted to the home base, formatted and processed appropriately by the software program on the home base PC.

The ON/OFF keys 7 work in a toggle fashion, a single depression will turn a component on another depression will turn a component off. All electric devices that would typically appear on a cart or kiosk, as mentioned above, are plugged into a series of industry standard duplex plugs power to which is controlled through an electric switch controller 23. When a ON/OFF toggle switch is depressed the signal from the control panel is sent to the microprocessor 1 and provided the proper security code has been entered the processor will signal the electric switch controller to turn on the appropriate device. Switched are provided for awning and menu display lighting, pumps, up to two refrigerators, up to 4 electric hot wells or burner assemblies (burner assembles may have up to two burners each) and soda fountains. Note the process of turning on a electrical service may or may not actually turn on the device or devices depending upon the electrical switching provided for at the device.

Devices may be turned ON or OFF from the home base station by transmitting the appropriate location code, security code and transaction code to the microcomputer via radio telemetry or direct modem connection the microprocessor will instruction the electric switch controller to turn ON or OFF the specified device in the same manner regardless if the request is initiated from the control panel 39 or from the home base through communications.

The communication keys 8 are program functions keys which upon depression send a two digit function key identification code to the microprocessor. Upon receiving the function key code the microprocessor initiates the appropriate transaction.

Transaction processing is under program control, programs directing processor action are resident in electrically erasable and programmable read only memory (EEPROM) memory 19 or some other nonvolatile memory so that program elements may be changed under the control of the base station which may initiate program changes through transmission of a new program instructions and so that the program elements may be saved in the event of a power failure or system shutdown.

Upon function key depression a program displays operator lead through messages requesting the entry of specific numeric data such as part number, quantity and the like or the number referencing a menu selection such as the one appearing on the menu in FIG. 6.

If a logical error is made or the information provided is incomplete an error message may also be displayed instructing the operator to fix the problem and retry.

A function key is provided with an appropriate icon on the face of the control panel 39 for each of the following transactions: Inventory, Change, Staff, Maintenance and Emergency.

In the 10-key cluster 59 there is a special key designated as MENU. Depression of the menu key instructs the processor 1 to display a system menu on the control panel display 6, referenced in FIG. 1 as 62, the system menu includes access to various system displays 9 including: Daily Sales, Inventory Status, Cash status, and Electrical Status, Maintenance Status, and Temperature readings (as referenced above).

One of the management features build into the programming is the ability to perform automatic unsolicited transmissions 9. On a periodic basis, determined by table values maintained on the home base station computer and transmitted to the microprocessor 1 and stored an EEPROM, program memory 19, the microprocessor under control of the data capture and polling facility program polls the POS device and a series of intelligent sensors 15 subsequently packages the data in a suitable record format and transmits the data to the home base station where it is processed under the control of the base station communication facility program. Significant management information and reporting is construction based upon the analysis of this data. For example upon analysis of sales information compared with starting inventory balances the home base computer would be in a position to recommend possible items to be replenished allowing management optimize sales by reducing stock outs without having to rely solely upon the judgement of the hourly employee at the remote location and consequently extends managements ability to effectively manage multiple remote locations efficiently. Another example of an automatic unsolicited transmission would occur when the microprocessor polls an intelligent device which is responsible for measuring the temperature of a refrigerated compartment 25 and determines that the temperature is out side of the acceptable range. The system as discussed above would transmit the problem to the home base where the transaction will be logged in a transaction log and subsequently printed out on a work order dispatch form, a maintenance man would then be dispatched to solve the problem.

Once again the system will help to enhance managements ability to effectively manage a series of mobile locations, increase profits by reducing food spoilage and increase customer approval of delivered product by helping to assure that all support equipment is in proper working order.

A table of acceptable ranges for sensor testing is maintained at the base station PC, transmitted to the microprocessor and store in program memory 19.

The system performs automatic polling and transmission of the following data 10: Hourly Sales (units and dollars), Critical supply shortages (fresh water, fuel, $CO_2$) 11, Mechanical failures, HI/LOW temperature violations.

On demand a series of business management reports may be printed or displayed by the headquarters home base station computer (PC). The information contained in the reports is collected from automatic and operator activated transmissions of data as described above. The scope of the reports 12 prepared by the system include: Inventory, Sales Analysis, Cashier Settlement and Work Order Dispatch.

The POS interface 13 is a microprocessor controlled communication port which receives its instructions from microprocessor 1 which down loads a micro code program at boot time the program is stored in a EEPROM 19. The intelligent interface is programmed to poll an external POS device connected via a RS232 interface. The polling sequence is determined by the requisite escape sequence as per the POS manufacturers specifications. Once the polling sequence has been initiated the POS system will transfer sales and inventory information back to the interface where the information will be stored until transferred to temporary memory 20. Once the transfer is complete microprocessor 1 will que up a transmission to the home base PC, format the data in the appropriate record format and execute the transmission per discussions above.

In a similar fashion the motion detector interface is polled based upon the times specified in the sensor table as discussed above. Typically the motion detector would be polled at non-business hours when the cart would be unattended and subject to abuse by vandals and the like.

The sensor interface 15 has eight ports. Each port is RS232 compatible with a RJ111 port connector. A cable with an RJ111 end on the interface side and a well known male 9 pin terminal on the other is used to cable connect the sensor interface to a series of intelligent sensors. The sensors are well known and of the variety that measure electronically fluids, gas pressure and temperature. 25

External communication to the home base is accomplished primarily through radio telemetry with a secondary communications path directed through conventional ground lines. When using radio telemetry various switches and controllers are required including the following well known components: T-switch 28, Terminal node controller 30 with RS232 port 29, and the radio receiver and transceiver 31.

Communication port #1, 16 and port #2, 17 are industry standard 16 bit serial interface cards plugged in to the system bus 24.

The data acquisition port 18 is an RS232 serial port with a cable connection to the data acquisition port 61, which is located on the face plate of the control panel 39. The cable specification was discussed in detail above.

Several applications execute under the control of the microprocessor 1. While executing the programs are resident in temporary memory 20. All programs which execute in microprocessor 1 are stored in the program memory 19 as discussed above. Control totals for cashier settlement, unit and dollar sales and data polled but not communicated to the home base are stored in both temporary memory and data storage memory 22. The data storage memory is supported with a well known battery backup device providing protection in the event of a power failure.

The headquarters base station is composed of a industry standard 80386 personal computer 52 with a minimum of 2 megabytes of memory, an 80 megabyte high performance disk drive a high speed matrix computer 53, a 4800 baud self correcting modem 54, and a radio telemetry communication configuration: node controller 55, UHF transmitter and transceiver 56, and a well known commercially available page encoder 57 which provides display pager capabilities and UHF transmitter and transceiver 58.

Figure 5B:
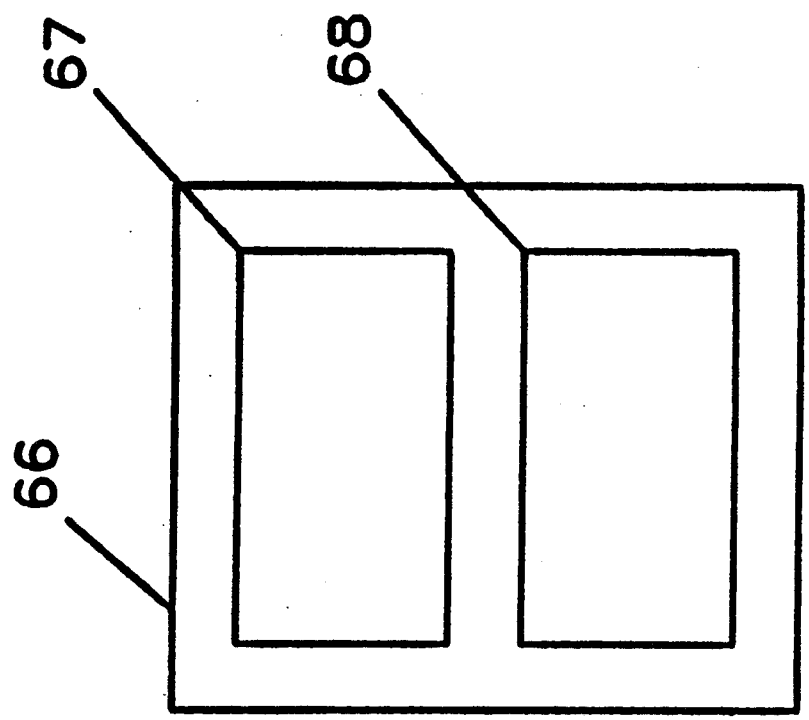
FIGS. 5A and 5B are general flow diagrams of the software modules employed in the mobile merchandising configuration and in the home base computer.
Figure 5A:
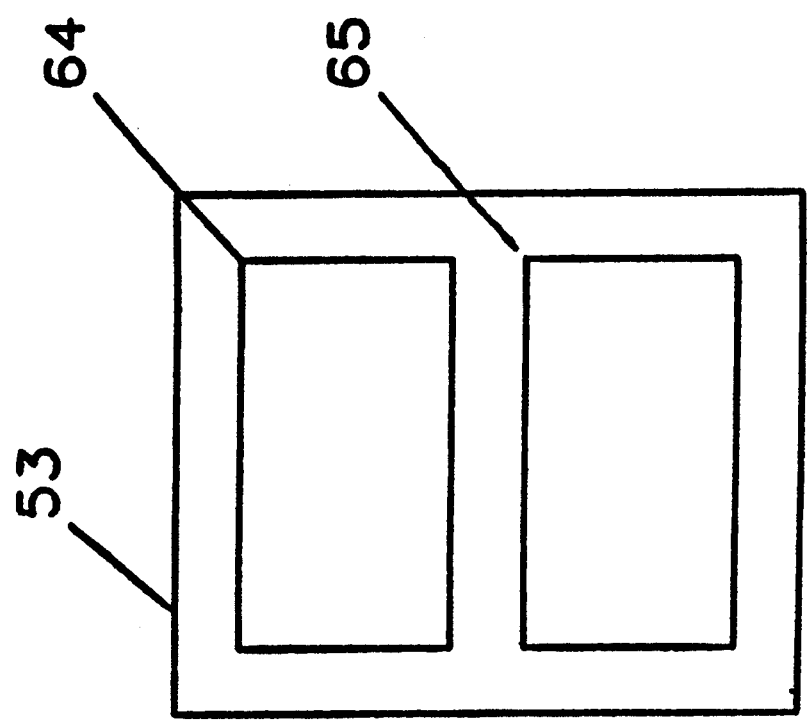

FIGS. 5A and 5B reference the relative location of the four main control programs as discussed above in detail. Mobile system software modules are resident in program memory 63, referenced as 19 in FIG. 4 the main software modules are the communication link manager 64 which handles all record formatting, record transmission, re-transmission, receiving data functions and data storage functions. The data capture facility manager 65 handles all system polling and keyboard data capture functions.

The headquarters base station software modules reside on convention hard disk until executed in system memory 66. The base station communication facility manager 67 handles all inbound and outbound communications to mobile locations, the formatting of all inbound and outbound messages and communications with the page encoder. The mass storage and reporting facility 68 is a series of programs which store data through the use of a commercially available relational database and several application programs which maintain database records and prepare business management reports.

All programs are written as micro code, assembler and C programs as would be appropriate based upon application and performance requirements. All software is developed for execution on Intel processor family chips or compatibles.

What is claimed is:

1. A system for managing a plurality of spaced apart merchandising units having limited storage facilities from a control base of operations including the management of personnel, cash resources, equipment status via operator requests for service and fully automatic functions, inventory control and enhanced personnel and equipment security comprising:

identifying means for generating a signal to identify each of said plurality of merchandising units;

a first plurality of system components at each of said merchandising units;

said first plurality of system components comprising:

an inventory control component for automatically generating signals indicative of the remaining quantity of each of a variety of merchandise for sale at such merchandising unit;

a plurality of operational components each of which automatically generates a signal indicative of its operational status;

an operator control panel for generating signals indicative of needs at each of said plurality of merchandising units;

a microprocessor located at each of said merchandising units for receiving said signals from said identifying means, said inventory control component, said plurality of operational components and said operator control panel;

first radio telemetry apparatus connected to said microprocessor located at each of said merchandising units for transmitting said signals from said identifying means, said inventory control component, said plurality of operational components and said operator control panel;

a second radio telemetry apparatus at a control base of operations located at a remote distance from each of said plurality of merchandising units for receiving signals from said first radio telemetry apparatus;

computer apparatus at said control base of operations connected to said second radio telemetry apparatus for interpreting said signals received by said second radio telemetry apparatus so that critical needs at any of said plurality of merchandising units are identified;

a series of thermometers at each merchandising unit for measuring ambient temperature, refrigeration temperature and heating element temperature and automatically sending signals to said microprocessor which transmits said signals to said control base of operations; and a series of sensors at each merchandising unit for measuring the quantity of available fresh water, waste water, ice, gaseous fuel and carbon dioxide and sending signals to said microprocessor which transmits said signals to said control base of operations.

2. The system as in claim 1 wherein:

said operator control panel has information entering means for entering information including inventory request, change request, staff request, maintenance request and emergency request.

3. The system as in claim 1 wherein:

at least some of said plurality of said merchandising units having mobile apparatus for permitting movement of said merchandising unit.

4. The system as in claim 3 and further comprising:

each of said merchandising units having mobile apparatus having at least one sensor for detecting motion of said mobile merchandising unit for sensing movement of said mobile merchandising unit and sending a signal to said microprocessor; and said microprocessor having a motion detector interface for sending a motion signal to said control base of operations.

5. The system as in claim 1 wherein:

said microprocessor automatically transmits hourly sales; critical supply shortage, mechanical failure and temperature violations.

6. The system as in claim 1 and further comprising:

signal generating means at said control base of operations for soliciting information from each of said merchandising units.

7. The system as in claim 1 wherein:

said radio telemetry apparatus comprises a UHF transmitter and receiver.

8. The system as in claim 1 and further comprising:

each of said merchandising units having an electrical switch controller; and said control base of operations generating signals to operate said electrical switch controller.

9. The system as in claim 1 and further comprising:

signal generating means and signal transmitting means at said control base of operations for controlling said operational components.

10. A system for managing a plurality of spaced apart merchandising units having limited storage facilities from a control base of operations including the management of personnel, cash resources, equipment status via operator requests for service and fully automatic functions, inventory control and enhanced personnel and equipment security comprising:

identifying means for generating a signal to identify each of said plurality of merchandising units;

a first plurality of system components at each of said merchandising units;

said first plurality of system components comprising:

an inventory control component for automatically generating signals indicative of the remaining quantity of each of a variety of merchandise for sale at such merchandising unit;

a plurality of operational components each of which automatically generates a signal indicative of its operational status;

an operator control panel for generating signals indicative of needs at each of said plurality of merchandising units;

a microprocessor located at each of said merchandising units for receiving said signals from said identifying means, said inventory control component, said plurality of operational components and said operator control panel;

first radio telemetry apparatus connected to said microprocessor located at each of said merchandising units for transmitting said signals from said identifying means, said inventory control component, said plurality of operational components and said operator control panel;

a second radio telemetry apparatus at a control base of operations located at a remote distance from each of said plurality of merchandising units for receiving signals from said first radio telemetry apparatus;

computer apparatus at said control base of operations connected to said second radio telemetry apparatus for interpreting said signals received by said second radio telemetry apparatus so that critical needs at any of said plurality of merchandising units;

said microprocessor located at each of said merchandising units having a pos interface, a motion detector interface, a sensor interface, two communication ports, a data acquisition port, a program memory, a temporary memory and a data storage control for transmitting signals between each of said merchandising units and said control base of operations and;

a series of sensors at each of said merchandising units for measuring the quantity of available fresh water, waste water, ice, gaseous fuel and carbon dioxide and automatically sending signals to said microprocessor located at each of said merchandising units;

a series of thermometers at each of said merchandising units for measuring refrigeration temperature, heating element temperature and ambient temperature and automatically sending signals to said microprocessor at each of said merchandising units;

said sensor interface receives signals from said microprocessor located at each of said merchandising units indicating fresh water supply, waste water supply, propane gas, carbon dioxide gas, refrigeration temperature, heating element temperature and ambient temperature and generates signals to be sent to said control base of operations.

11. The system as in claim 10 and further comprising:

a first modem for receiving signals from and sending signals to said microprocessor at each of said merchandising units and for receiving signals from and sending signals to said control base of operations;

a second modem at said control base of operations for receiving signals from and sending signals to said first modem.

* * * * *